April 28, 1942.  T. B. MARTIN  2,281,365
ENGINE STARTER GEARING
Filed Aug. 21, 1940  2 Sheets-Sheet 1
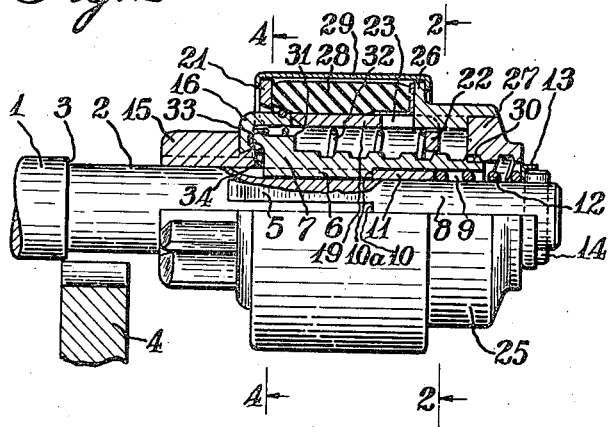
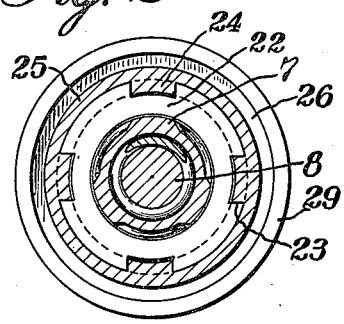
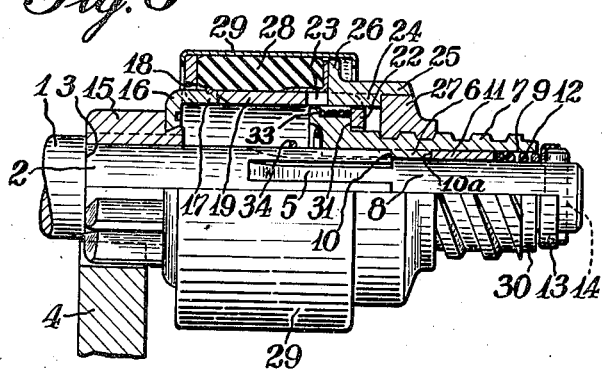
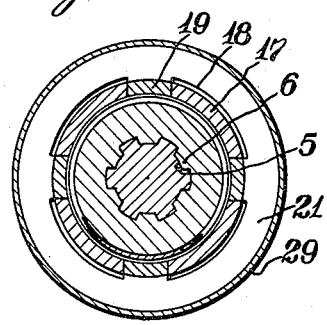
Witness:
Burr W. Jones
INVENTOR.
Thomas B. Martin
BY Clinton S. Jones
ATTORNEY.

April 28, 1942.                T. B. MARTIN                 2,281,365
                          ENGINE STARTER GEARING
               Filed Aug. 21, 1940              2 Sheets-Sheet 2
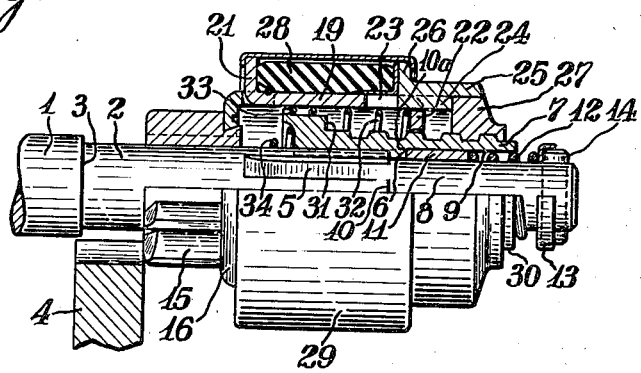
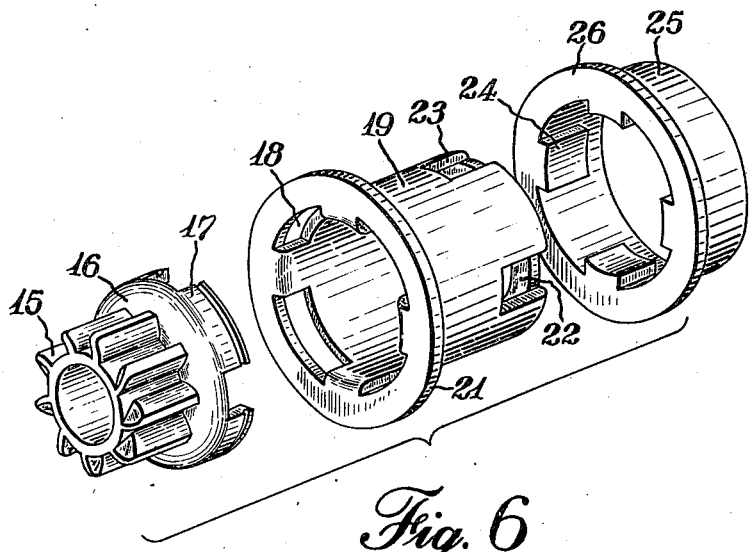
INVENTOR.
Thomas B. Martin Patented Apr. 28, 1942

2,281,365

UNITED STATES PATENT OFFICE 2,281,365

ENGINE STARTER GEARING

Thomas B. Martin, Elmira, N. Y., assignor to Bendix Aviation Corporation, South Bend, Ind., a corporation of Delaware Application August 21, 1940, Serial No. 353,490

9 Claims. (Cl. 74—7)

The present invention relates to engine starter gearing and more particularly to a drive of the automatically engaging and disengaging type.

It is an object of the present invention to provide a novel engine starter drive which is efficient in operation, rugged in construction but small in size.

It is another object to provide such a device which is economical to manufacture and is easily assembled and installed.

It is another object to provide such a device incorporating provisions for enforcing proper engagement of the pinion with the engine gear and for preventing the pinion from hunting or oscillating longitudinally on its drive shaft as the engine passes over its compression points.

Further objects and advantages will be apparent from the following description taken in connection with the accompanying drawings in which:

Fig. 1 is a side elevation partly in section of a preferred embodiment of the invention;

Fig. 2 is a section taken substantially on the line 2—2 of Fig. 1;

Fig. 3 is a view similar to Fig. 1 showing the parts in driving position;

Fig. 4 is a section taken substantially on the line 4—4 of Fig. 1;

Fig. 5 is a view similar to Fig. 1 showing the parts in the positions assumed in case a tooth of the pinion abuts against a tooth of the engine gear; and Fig. 6 is a detail in perspective of the pinion, barrel and driving sleeve shown in disassembled relation.

In Fig. 1 of the drawings there is illustrated a power shaft 1 which may be the extended armature shaft of the starting motor, not illustrated. A portion of the shaft 1 is reduced in diameter as shown at 2, thus providing a shoulder 3 located adjacent the inner edge of an engine gear 4. Spline grooves 5 are formed in the portion 2 of the power shaft for cooperation with internal spline ribs 6 formed in a screw shaft 7. The portion of the power shaft beyond the spline grooves 5 is further reduced in diameter by the depth of said grooves as indicated at 8, thereby forming shoulders 10 at the ends of the splines defined by the grooves. The interior of the screw shaft 7 beyond the ribs 6 is counterbored as shown at 9, forming shoulders 10a at the ends of the ribs 6, and a spacing ring 11 is brazed into the counterbore against the shoulders 10a. Ring 11 bears slidably on the reduced portion 8 of the power shaft and is yieldingly held against the shoulders 10 on the shaft by means of a compression spring 12 bearing against a thimble 13 seated on a cross pin 14. Inasmuch as the ring 11 is fixedly connected to the screw shaft 7, the normal position of the screw shaft as shown in Fig. 1 is defined by the abutment of ring 11 against the shoulder 10, in which position it is yieldingly maintained by the spring 12.

A pinion 15 is slidably journalled on the portion 2 of the power shaft 1 for movement into and out of engagement with the engine gear 4, the operative position of the pinion being defined by the shoulder 3 on the shaft. A flange member 16 is rigidly connected to the pinion 15 in any suitable manner and is provided with longitudinally extending tongues 17 (Fig. 6) adapted to engage in openings 18 in a barrel member 19. Barrel 19 is provided at its end adjacent the pinion 15 with a radial flange 21, and at its opposite end with an inwardly extending flange 22. Openings 23 are formed in the end of the barrel adjacent the flange 22 adapted to receive spline blocks 24 formed in the interior of a drive sleeve 25 whereby said sleeve is splined to the barrel. Sleeve 25 is provided with a radial flange 26, and is rigidly connected in any suitable manner as by brazing to a nut 27 threaded on the screw shaft 7.

Means for normally holding the drive sleeve and barrel in extended relation is provided in the form of an annular block 28 of elastically deformable material located between the flanges 21 and 26 and maintained under slight initial compression by means of an enclosing sleeve 29 having its ends spun over said flanges.

Screw shaft 7 is provided with an abutment 31 at one end adapted to engage the inturned flange 22 of the barrel to limit relative movement between the screw shaft and barrel. An anti-drift spring 32 is mounted in the barrel, bearing at one end against the flange 22 and at its other end against a shoulder 33 formed on the abutment 31 of the screw shaft whereby the pinion, barrel and associated parts are yieldingly maintained in idle position. The threads of the screw shaft 7 terminate short of the end thereof as indicated at 30, thereby permitting the nut 27 to run off the ends of the threads when the pinion is in idle position. A re-entry spring 34 is located between the end of the screw shaft 7 and the pinion 15 in order to insure re-engagement of the threads upon actuation of the screw shaft by the power shaft.

In operation, starting with the parts in the positions illustrated in Fig. 1, rotation of the power shaft 1 is transmitted through the splined connection 5, 6 to the screw shaft 7 whereby the nut 27 with its associated parts is threaded along the screw shaft to move the pinion into engagement with the engine gear 4. When the pinion is fully meshed, it engages the shoulder 3 on the power shaft, whereupon the screw shaft is caused to move back against the force of the spring 12 until the abutment 31 engages the flange 22 of the barrel. Further backward movement of the screw shaft is thereupon opposed not only by the spring 12 but also by the elastic ring 28 which is thereby compressed between the flanges 21 and 26. When sufficient torque has been thus built up to overcome the resistance of the engine to rotation, the pinion 15 will rotate to crank the engine.

When the engine becomes self-operative, the acceleration of the pinion 15 by the engine gear causes the parts to return to their idle positions, the nut 27 running off the ends of the threads on the screw shaft whereby the nut with its associated parts can overrun freely until their momentum is dissipated.

When, during the cranking operation, the engine passes over its compression points, the pinion may be accelerated sufficiently to cause it to overrun the power shaft to some extent. When this happens, the screw shaft 7 is caused to shuttle back and forth from its driving position shown in Fig. 3 toward its normal position as in Fig. 1, while maintaining the pinion in full mesh with the engine gear by virtue of the pressure of spring 12.

The spring 12 further cooperates with the slidable screw shaft in enforcing proper mesh of the pinion with the engine gear. If a tooth of the pinion should, during the meshing operation, abut against the end of a tooth of the engine gear, longitudinal motion of the pinion will be arrested and the screw shaft 7 will move back as shown in Fig. 5, compressing the spring 12 until sufficient torque is built up to cause the pinion to be indexed into proper registry with the engine gear, whereupon meshing and cranking take place as usual. It will be understood that the elastic element 28 may also cooperate to facilitate the meshing operation, the degree of such cooperation depending upon the stiffness of the material used. The primary function of this element, however, is the formation of the yielding driving connection during cranking.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In an engine starter drive, a power shaft, a screw shaft splined thereon, a pinion journalled on the power shaft and slidable into engagement with a member of an engine to be started, said power shaft having stop means defining the operative position of the pinion, a barrel member fixed to the pinion, a nut threaded on the screw shaft and splined to the barrel, yielding means transmitting longitudinal movement of the nut to the barrel in a direction to engage the pinion with the engine member, and yielding means opposing longitudinal movement of the screw shaft in the opposite direction.

2. In an engine starter drive, a power shaft, a screw shaft splined thereon to rotate therewith, a pinion slidably journalled on the power shaft, a barrel surrounding the screw shaft having a radial flange at one end, means rigidly connecting the pinion to the barrel, a nut on the screw shaft, a sleeve fixed on the nut having a splined connection with the barrel and a threaded connection with the screw shaft, said sleeve having a radial flange, and an elastically compressible member on the barrel between said flanges.

3. In an engine starter drive, a power shaft, a screw shaft splined thereon, a pinion slidably journalled on the power shaft for movement into and out of engagement with a member of an engine to be started, a nut on the screw shaft, means slidably but non-rotatably connecting the nut to the pinion, stop means on the screw shaft defining the operative position of the pinion, abutment means limiting longitudinal movement of the screw shaft away from the pinion, and elastic cushioning means between the nut and pinion.

4. In an engine starter drive, a power shaft, a screw shaft splined thereon, a pinion slidably journalled on the power shaft, a nut on the screw shaft, means slidably but non-rotatably connecting the nut to the pinion, stop means on the power shaft engageable by the pinion for limiting its longitudinal movement, means limiting longitudinal movement of the screw shaft on the power shaft, and elastic cushioning means between the nut and pinion.

5. In an engine starter drive, a power shaft, a screw shaft splined thereon, a pinion slidably journalled on the power shaft for movement into and out of engagement with an engine member, a barrel member fixed to the pinion, stop means limiting longitudinal movement of the pinion, means in the barrel limiting longitudinal movement of the screw shaft, a nut on the screw shaft, and a yielding transmission between the nut and barrel.

6. In an engine starter drive, a power shaft, a screw shaft splined thereon, a pinion slidably journalled on the power shaft for movement into and out of engagement with an engine member, a barrel member fixed to the pinion, stop means limiting engaging movement of the pinion, means limiting backward movement of the screw shaft, a nut on the screw shaft slidably but non-rotatably connected to the barrel, and an elastic cushion between the nut and the barrel.

7. In an engine starter drive, a power shaft having a reduced cylindrical portion defined by a radial shoulder and a further reduced smooth terminal portion, a pinion journalled on the first reduced portion and slidable thereon into engagement with said shoulder, a hollow screw shaft non-rotatably mounted on said first reduced portion, a threaded driving member on the screw shaft, a barrel member having a splined connection with the driving member, and yielding transmission means between the driving member and barrel.

8. In an engine starter drive, a power shaft having a reduced cylindrical portion defined by a radial shoulder, and having spline grooves formed therein, said shaft having a further reduced smooth terminal portion, a pinion journalled on the first reduced portion and slidable thereon into engagement with said shoulder, a hollow screw shaft splined on said first reduced portion, yielding means opposing longitudinal movement of the screw shaft, a threaded driving member on the screw shaft, a barrel member having a splined connection with the driving member and rigidly connected to the pinion, and yielding means normally holding the driving member and barrel in extended relation.

9. In an engine starter drive, a power shaft, a pinion slidably journalled thereon, a stop on the power shaft defining the operative position of the pinion, traversing means for the pinion including a screw shaft, means slidably but non-rotatably connecting the screw shaft to the power shaft, a threaded member on the screw shaft, means yieldingly transmitting longitudinal movement from the threaded member to the pinion, means limiting the relative longitudinal movement of the screw shaft and threaded member, and yielding means opposing longitudinal movement of the screw shaft.

THOMAS B. MARTIN.